(12) United States Patent
Barnes et al.

(10) Patent No.: US 6,192,868 B1
(45) Date of Patent: Feb. 27, 2001

(54) APPARATUS AND METHOD FOR A COLD START TIMING SWEEP

(75) Inventors: Travis E. Barnes, Loveland, CO (US); William H. Lane, Chillicothe; Alan R. Stockner, Metamora, both of IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 09/220,301

(22) Filed: Dec. 23, 1998

(51) Int. Cl.$^7$ .................................................. F02D 41/06
(52) U.S. Cl. ........................... 123/491; 123/446; 123/476
(58) Field of Search ................................. 123/446, 381, 123/476, 491; 701/103, 104, 105

(56) References Cited

U.S. PATENT DOCUMENTS

| | | | |
|---|---|---|---|
| 4,827,886 | * 5/1989 | Maeda | 123/476 |
| 4,936,277 | * 6/1990 | Deutsch et al. | 123/476 |
| 5,423,302 | * 6/1995 | Glassey | 123/446 |
| 5,445,129 | 8/1995 | Barnes | 123/446 |
| 5,564,391 | 10/1996 | Barnes et al. | 123/446 |
| 5,572,977 | 11/1996 | Shibata et al. | 123/480 |
| 5,582,152 | 12/1996 | Drutel et al. | 123/436 |
| 5,586,544 | 12/1996 | Kitamura et al. | 123/684 |
| 5,621,160 | * 4/1997 | Carroll, III et al. | 701/103 |
| 5,636,621 | 6/1997 | Maki et al. | 123/673 |
| 5,685,276 | 11/1997 | Tanaka et al. | 123/478 |
| 5,687,694 | 11/1997 | Kanno | 123/479 |
| 5,697,343 | 12/1997 | Isozumi et al. | 123/446 |
| 5,791,316 | * 8/1998 | Houtz et al. | 123/491 |
| 6,029,631 | * 2/2000 | Jiewertz et al. | 123/491 |

FOREIGN PATENT DOCUMENTS

| | | |
|---|---|---|
| 0 810 364 | 12/1997 | (EP) . |
| 0 835 997 | 4/1998 | (EP) . |
| 61169629 | 7/1986 | (JP) . |
| 05288109 | 11/1993 | (JP) . |
| 07119516 | 5/1995 | (JP) . |
| 09088703 | 3/1997 | (JP) . |

\* cited by examiner

Primary Examiner—Willis R. Wolfe
(74) Attorney, Agent, or Firm—W. Bryan McPherson, III

(57) ABSTRACT

The present invention provides an apparatus and method for controlling the fuel injection timing of a fuel injector in order to start an engine. The temperature of the engine is sensed and an engine temperature signal indicative of the temperature of actuating fluid used to actuate the injector is generated. A desired piston firing position is determined, and an injection command signal is generated, whose timing oscillates between a time range that is a function of said temperature and said desired piston firing position, to control the fuel injection timing.

33 Claims, 6 Drawing Sheets

APPARATUS AND METHOD FOR A COLD START TIMING SWEEP

TECHNICAL FIELD

The present invention relates generally to fuel injection systems and, more particularly to electronic control systems for independently controlling the fuel injection timing to start an engine.

BACKGROUND ART

In a fuel system having hydraulically-actuated electronically controlled unit injectors (HEUI), high pressure hydraulic actuating fluid flows into a chamber, located within the injector, and pushes down on a plunger which pushes fuel out from a plunger cavity, and out the injector through a nozzle. A solenoid, located within the injector, controls when the high pressure actuating fluid is exposed to the plunger by moving a poppet valve. The amount of fuel injected is controlled by adjusting the duration the solenoid is on.

The viscosity of the actuating fluid effects both the amount of fuel delivered by the injector, and when the delivery process begins. For example, in cold temperatures the actuating fluid is thicker (more viscous) than at warm temperatures. Therefore, when an electrical signal is delivered to a solenoid, commanding the solenoid to deliver actuating fluid to the injector, the fluid flows at a slower rate into the chamber to push against the plunger. With the actuating fluid moving at a slower rate there is an increased delay before the injector begins delivering fuel. Furthermore, when the solenoid is again turned off to stop delivery of the fuel, the reduced flow rate of the actuating fluid results in less total fuel being injected between when the solenoid is turned on and off. Hence, with a high viscous actuating fluid seen at cold starting temperatures as compared to higher temperature operating conditions, the fuel is injection occurs later because of the slower rate of the fluid, and an inaccurate amount of fuel is delivered by the injectors and then starting/stopping, or "injection" fuel delivery shifts. Under these conditions, overall engine performance is adversely effected, resulting in incomplete combustion, low power, white smoke, etc. In addition, an engine may not be able to start if the injection does not occur at the correct time, with respect to the location of the piston within the cylinder chamber. Therefore, changes in temperature affect the ability to start an engine.

The viscosity of the actuating fluid is a function of the fluid type and the temperature of the fluid. In an operating engine, neither the type of fluid, nor the temperature is fixed. The fuel system may use a variety of actuation fluids. For example, a more viscous 15W40 engine oil or a less viscous OW20 engine oil may be used. Also the fuel system operates over a wide range of temperatures, e.g.,—40 degrees Celsius through 120 degrees Celsius.

The reduction in fuel delivery and delays in timing increase as the viscosity of the actuating fluid increases. If the changes in viscosity are not accounted for, the fuel delivery and timing may be incorrect making it difficult to start and run the engine especially at high viscosities encountered at cold temperatures. If the fuel delivery is too small, or is not delivered at the proper time, the engine may not start or be underpowered. If the fuel delivery is too large the engine structural capabilities may be exceeded, or excessive smoke produced and misfire may occur.

The present invention is directed to overcoming one or more of the problems identified above.

DISCLOSURE OF THE INVENTION

In one aspect of the present invention, a method for controlling a fuel injection timing of a fuel injector to start an engine is disclosed. The method includes the steps of sensing the temperature of the engine and producing an engine temperature signal, determining a desired piston firing position; producing an injection command signal whose timing oscillates between a time range that is a function of said temperature.

In yet another embodiment of the present invention, an apparatus for controlling a fuel injection timing of a fuel injector to start an engine is disclosed. The apparatus comprises a temperature sensing device adapted to sense a temperature of the engine and responsively produce an engine temperature signal, and a controller adapted to receive said temperature signal, determine and responsively produce an injection command signal whose timing oscillates between a time range that is a function of said temperature.

BEST MODE FOR CARRYING OUT THE INVENTION

Figure 1:
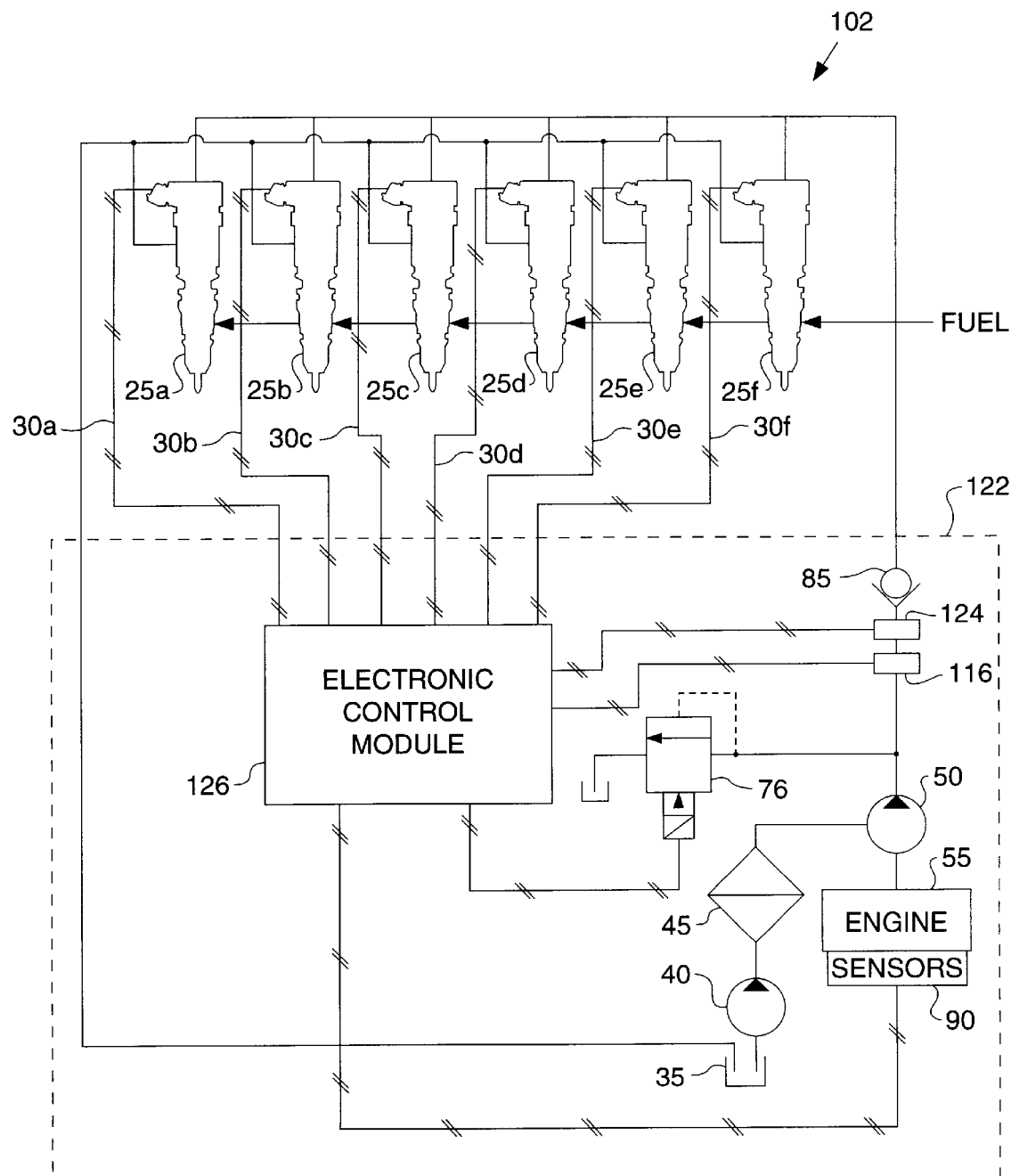
FIG. 1 is a high level illustration of a fuel system of an engine.

The present invention provides a method and apparatus for controlling the fuel injection timing of a fuel injector during the starting of an engine. FIG. 1 is an illustration of one embodiment of a fuel system 102 of an engine. The fuel system 102 includes at least one fuel injector 25a–f for each combustion chamber or cylinder of the fuel system 102. In the preferred embodiment, the fuel injectors are hydraulically actuated electronically controlled unit injectors (HEUI). However, a conventional fuel injector that is associated with a common rail fuel system is equally applicable. Each injector 25a–f has an associated solenoid (not shown). In FIG. 1, six unit injectors 25a–f are shown, however, the present invention is not limited to use in connection with a six cylinder engine. To the contrary, it may be easily modified for use with an engine having any number of cylinders and unit injectors 25.

The fuel system 102 also includes a circuit 122 for supplying actuating fluid to each injector 25. Actuating fluid is required to provide sufficient pressure to cause the unit injectors 25 to open and inject fuel into an engine cylinder. In one embodiment the circuit 122 includes a pump 50, driven by an internal combustion engine 55. The output of the pump 50 is connected to each fuel injector 25. A fluid sump 35 is attached, through a return line, back to the pump 50. Low pressure actuating fluid is pumped from the sump 35 by a low pressure pump 40 through a filter 45, which filters impurities from the fluid. Each injector 25 is also connected to the fluid sump 35 in order to return the actuating fluid to the sump 35.

The circuit 122 includes an Injector Actuation Pressure Control Valve 76, hereinafter referred to as the IAPCV, for regulating how much actuating fluid flows to the injectors 25 as opposed to the fluid sump 35. By adjusting how much of the actuating fluid flow provided by the pump 50 goes to the injectors 25a–f as compared to the sump 35, the pressure of the fluid supplied to the injectors 25a–f may be regulated. Other devices, which are well known in the art, may be readily and easily substituted for the fixed displacement pump 50 and the IAPCV. For example, one such device includes a variable pressure high displacement pump. A check valve 85 is also provided.

The fuel system 102 includes an engine speed sensor 90. In one embodiment, the speed sensor 90 reads the signature of a timing wheel applied to the engine camshaft to indicate the engine's rotational position and speed. The sensor 90 monitors the rotational position of the crankshaft relative to top dead center position and bottom dead center position of the respective cycle or stroke. The sensor 90 generates a speed signal.

The circuit 122 includes a temperature sensor 124. The temperature sensor 124 senses the temperature of the actuating fluid, and responsively generates a fluid temperature signal. In one embodiment the actuating fluid is petroleum based oil. However, the fluid may be a synthetic oil, fuel, or other type of non-compressible fluid.

The circuit 122 also includes an electronic control module 126. The controller 126 receives the engine speed signal and temperature signal and responsively determines the injection timing for the fuel injectors 25a–f. The controller 126 delivers an injection command signal to the solenoid of the appropriate injectors 25. The controller 126 contains software decision logic and information defining fuel system operational parameters and controls key components.

The injectors 25a–f are individually connected to outputs of the controller 126 by electrical connectors 30a–f respectively.

Figure 2:
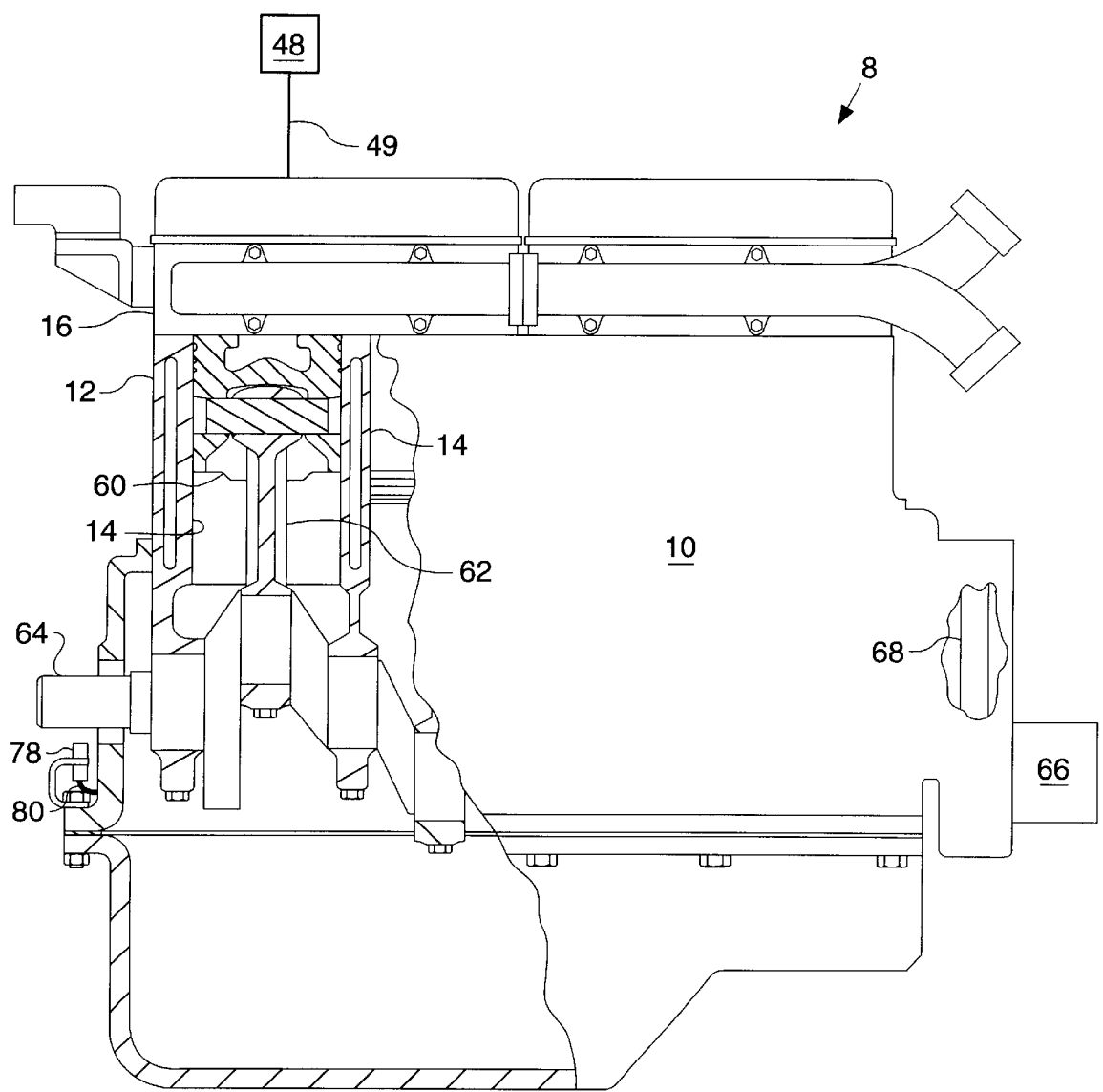
FIG. 2 is a sectional view of one embodiment of a portion of an internal combustion engine embodying the present invention.
Figure 3:
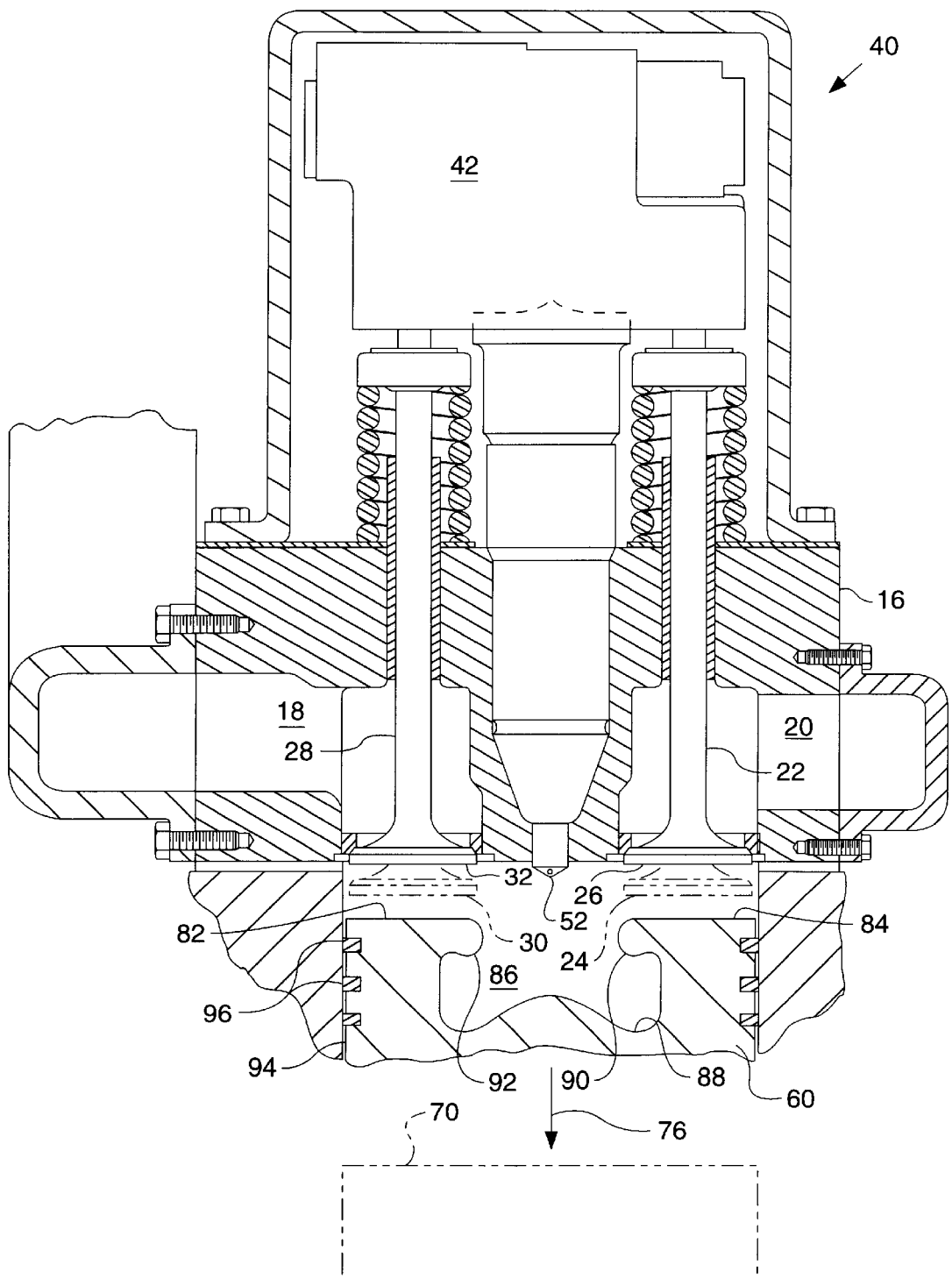
FIG. 3 is an enlarged sectional view of one embodiment of a portion of an internal combustion engine embodying the present invention.
Figure 4:
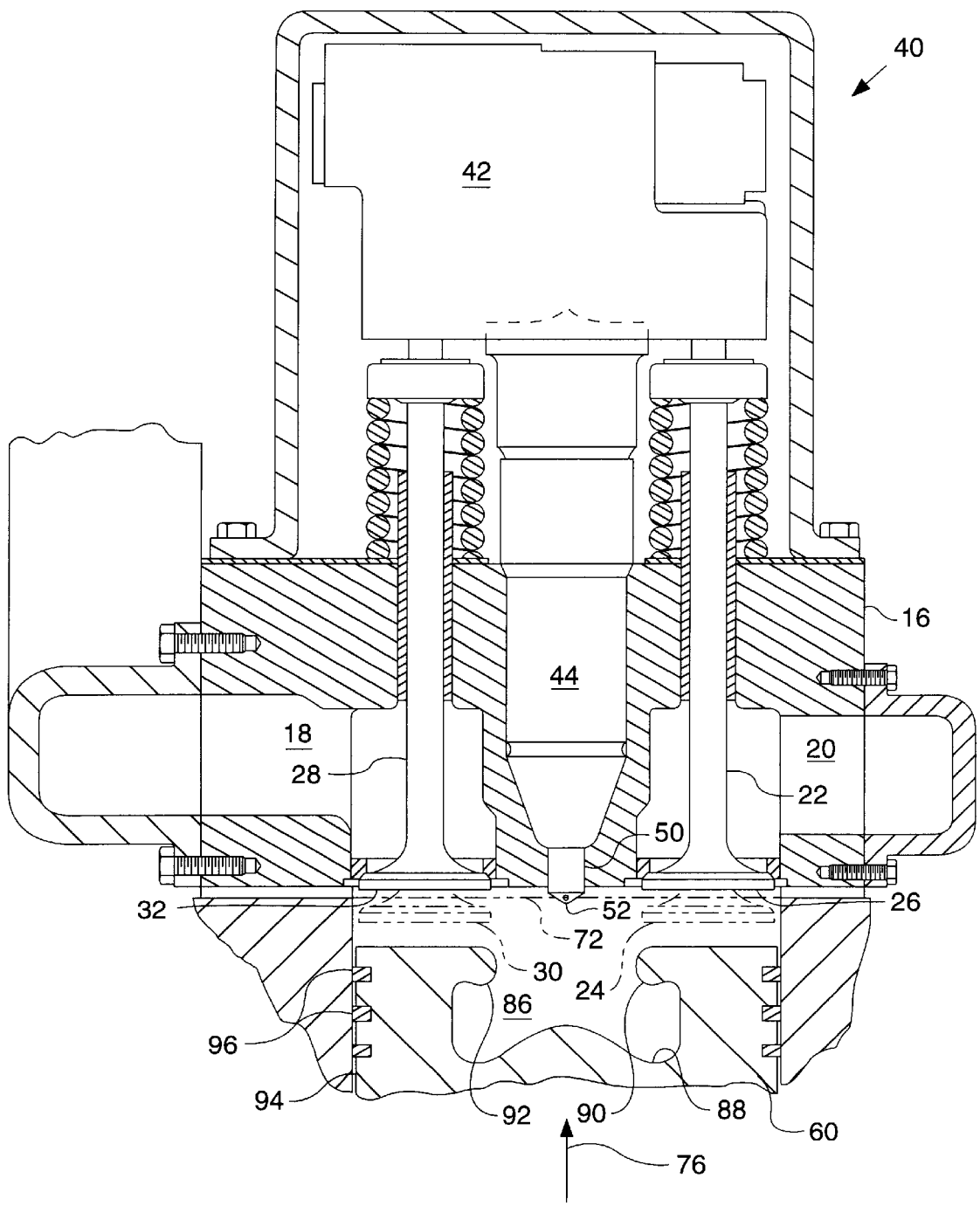
FIG. 4 is an enlarged sectional view of one embodiment of a portion of an internal combustion engine embodying the present invention.

FIG. 2 is a cross sectional view of one embodiment of a portion of an internal combustion engine associated with the present invention. Each injector 25 is associated with a cylinder 14, as illustrated in FIG. 2. Positioned within each of the plurality of cylinders 14 is a piston 60. The piston 60 is attached to a connecting rod 62 being attached to a crankshaft 64. The crankshaft 64 is rotatably positioned within the block 12. During starting, a starter 66 rotates a flywheel 68 being attached to the crankshaft 64 in a conventional manner. And, as the crankshaft 64 rotates, the piston 60 is moved between a bottom dead center position, as shown in phantom in FIG. 3, and a top dead center position, as shown in phantom in FIG. 4. In one embodiment the engine 10 is a four stroke engine having an intake stroke, a compression stroke, a power stroke, and an exhaust stroke.

In operation, the crankshaft 64 of the engine 10 is rotated by activating the starter 66. This results in the piston 60 moving between the top dead center position and through the four strokes or cycles. The speed sensor 90 monitors the rotational position of the crankshaft and sends a signal to the controller 126. The controller 126 interprets the signal and at a determined time, relative to the rotational position of the crankshaft 64 and the piston 60, sends the injection command signal to the fuel injector 25 of the appropriate cylinder 14, to inject the fuel into the cylinder 14. However if the fuel is injected too soon or too late the cylinder 14 may not fire properly, and the engine 10 may not start. Therefore, the proper injection timing should be determined.

Figure 5:
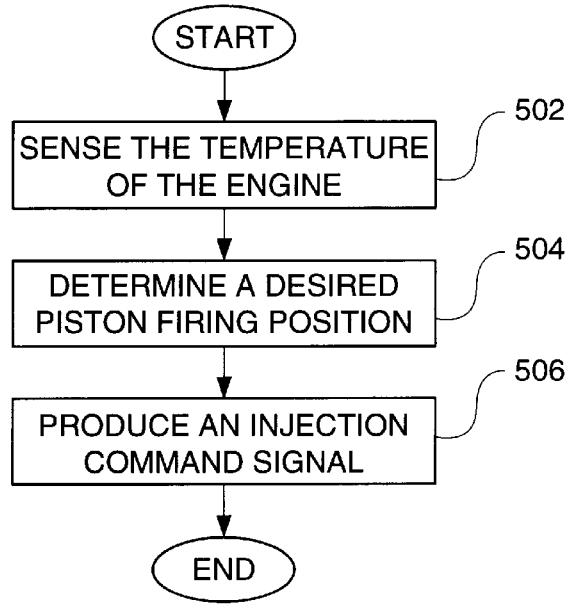
FIG. 5 is an illustration of the method for controlling a fuel injection timing of a fuel injector to start an engine.

The present invention includes a method for controlling the fuel injection timing of a fuel injector to start an engine 10. At engine starting conditions while the engine is cranking but not yet firing, the present invention employs a sweeping strategy to determine a desired timing to deliver the injection command signal to the solenoid of a particular fuel injector 25. In the preferred embodiment, the desired timing determined is the optimum timing. The method includes the steps of sensing the temperature of the engine 10 and producing an engine temperature signal indicative of the temperature of actuating fluid used to actuate the injector, determining a desired piston firing position and, producing an injection command signal whose timing oscillates through a time range that is a function of the temperature and the desired piston firing position to control the fuel injection timing. FIG. 5. illustrates a flow diagram of the present invention.

In a first control block 502, the temperature of the engine is sensed by the sensor 124, and a temperature signal indicative of the temperature of the actuating fluid is delivered to the controller 126.

In a second control block 504, a desired piston firing position is determined. In one embodiment of an engine 10, fuel is injected into a cylinder 14 having a glow plug (not shown). As the fuel is injected, the heat generated by the glow plug causes the fuel to ignite, or fire. The fuel ignition may be referred to as the cylinder firing. The piston firing position refers to the position of the piston at the time of the firing. The location of the piston 60 when the cylinder 14 fires is important, and effects the power the piston 60 provides to the engine 10. For example, if the piston firing position to obtain optimal engine power is two degrees after top dead center, it is undesirable to have the cylinder 14 fire when the piston is in the compression stroke, i.e., prior to reaching top dead center. This is particularly true with a high squish piston. A desired firing position of a piston 60 may vary from one engine to another, and from one piston structure to another. In one embodiment, a desired piston firing position may be empirically determined and stored in the controller 126. For example, a desired piston firing position may empirically be determined to be two degrees after top dead center of the crankshaft 64. In another embodiment, the firing position may be dynamically determined.

Figure 6:
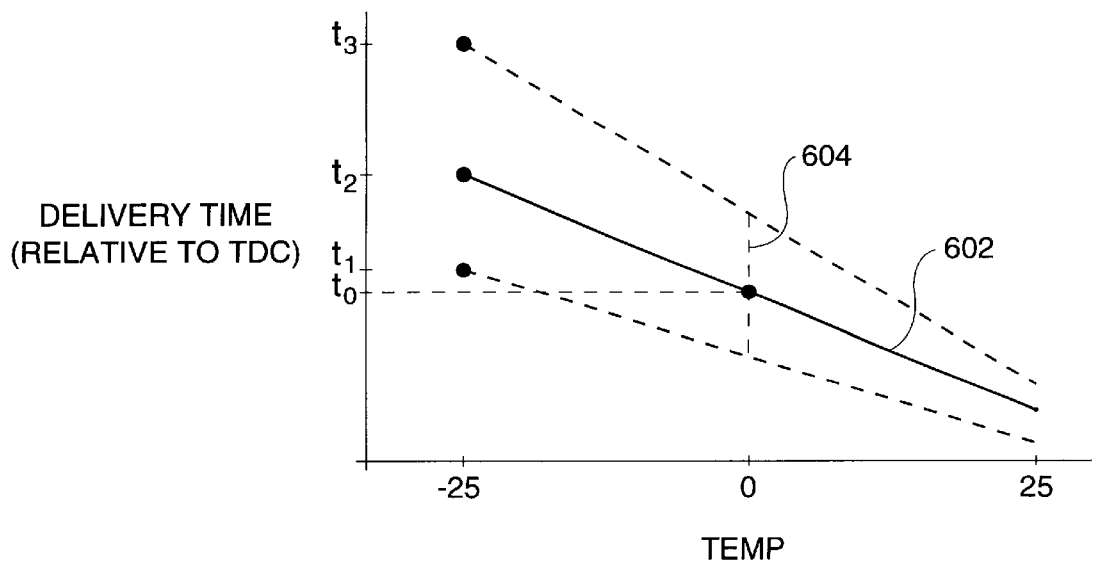
FIG. 6 illustrates one embodiment of a fuel injection timing map.

In a third control block 506, an injection command signal is produced by the controller 126 in response to the desired piston firing position and the fluid temperature. FIG. 6 illustrates one embodiment of a fuel injection timing map. An injection map illustrates the desired injection time relative to the piston position, as a function of temperature, for a particular oil grade. For example, for a desired piston firing position of two degrees after top dead center, and a sensed temperature of 0 degrees Celsius, the injection command signal should be delivered by the controller 126 to the solenoid at $t_0$ seconds prior to the piston 60 reaching the desired firing position, e.g., two degrees after top dead center. The injection timing line 602 illustrates how the injection timing may vary based on temperature. For a particular oil grade, when the temperature changes from 0 degrees to −25 degrees, the timing of the deliver of the injection command signal needs to be accelerated from being delivered $t_0$ seconds prior to the desired piston firing position to $t_2$ seconds prior to the desired position, where $t_2$ is greater than $t_0$. One reason for the variation is that the viscosity of the actuating fluid varies as the temperature varies. Another reason for the variation is the ignition delay portion of the combustion cycle, which is a function of the temperature and fuel type. As the temperature gets colder, the actuating fluid does not flow as fluidly, or quickly. The colder the temperature is, the more viscous, or thicker the fluid is. When the injection command signal is delivered to the solenoid, there is a delay between the time the solenoid is energized, enabling fluid to flow into the injector 25, and the time the fluid provides sufficient force to inject fluid. A colder temperature results in a longer delay between the time the injection command is delivered to the solenoid, and the time the fuel is actually injected. Therefore if the timing of an injection signal is determined based on enabling the piston 60 to fire at two degrees after top dead center, and the temperature is 0 degrees, then when the temperature drops 25 degrees, if the timing of the injection command signal is not accelerated, the fuel injection will be delayed, and the piston will fire late. Therefore, the injection signal needs to be delivered earlier in order to achieve the same firing position, when the temperature drops.

Multiple types of oil grades may be used in an engine as the actuating fluid. Each oil grade having its own viscosity. Actuating fluid of the same grade, but made by two different manufacturers may have two different viscosities at the same temperature. In addition, the length of time the actuating fluid has been used in the engine will also effect the viscosity of the fluid. Variations in the fluid viscosity have a significant effect on proper fuel injection timing. As described earlier, improper fuel injection may prevent the engine from starting. Accurately predicting the viscosity, or the effects of viscosity, and the precise firing delays, prior to starting the engine may not be possible. Therefore, the present invention accounts for the viscosity and firing variability by identifying a time duration range 604, or sweep range, which, based on the current temperature and the desired piston position, the preferred injection timing may occur within. In the preferred embodiment, the timing range is emperically developed by analyzing potential engine oils to be used throughout the temperature range, and throughout the stages of age, to determine the timing sweep. This same analysis may be performed with other potential actuating fluids such as fuel. In the preferred embodiment the timing sweep is also developed with respect to the desired position firing position. In one embodiment, as illustrated in FIG. 6, the timing sweep will vary as a function of the temperature. The colder the temperature, the larger the range of the timing sweep due to the potential varying viscosities and firing delays of the engine.

Figure 7:
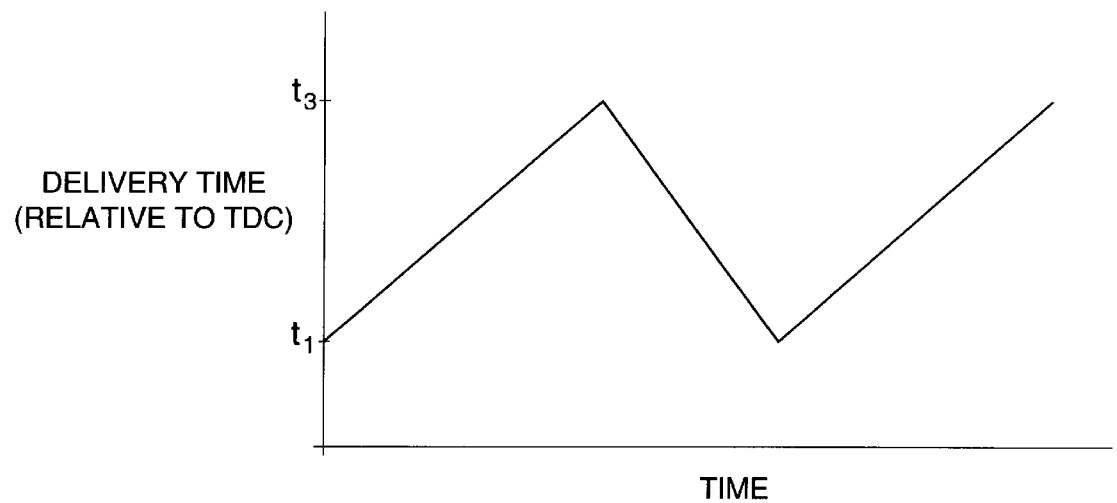
FIG. 7 illustrates an one embodiment of a timing sweep.

Therefore, in the preferred embodiment, once the temperature and desired piston position have been determined, the timing range is determined. The time when the injection command signal should be delivered to the injector 25 is determined from the range of the timing sweep. The delivery time may first be selected as the minimum, maximum or average value of the time range. In an alternative embodiment, the start of injection may be determined to be the last delivery time used when the engine 10 was last started. Alternatively the start of injection may be determined by taking the last delivery time used when the engine 10 was last started, then modifying the last delivery time based on the current temperature. Then, at the appropriate time an initiate command injection signal, also commonly referred to as the start of current signal, is delivered to the solenoid of the appropriate injector 25. In one embodiment, after one cycle, if the engine 10 does not start, timing of the injection command signal is modified and an injection command signal is again delivered to the solenoid. In an alternative embodiment, a particular injection timing may be tried multiple times before selecting another injection timing. The start of injection time is swept throughout the time range until the engine starts, or a strong firing is detected. A strong firing may be detected by sensing an instantaneous speed change via the crank angle. A strong cylinder firing will occur when the injection command signal is delivered to the solenoid at the proper time to inject fuel into the cylinder 14 at the proper piston position. During cranking, the engine 10 may be turning at 100 RPM. When a strong firing of one cylinder occurs, the instantaneous speed may jump up to approximately 200 RPM. Therefore, in one embodiment, the start of injection time may be swept throughout the time range until a strong cylinder firing occurs. In another embodiment, the injection time may be swept until two consecutive strong cylinder firings occur. The engine 10 may start after four strong cylinder firings in a row. Therefore, in one embodiment, the start of injection time may be swept until the engine 10 is running. FIG. 7 illustrates an one embodiment of the timing sweep resulting from the time range 604. In the example of FIG. 7, the timing sweep begins with a delivery time of $t_1$ seconds prior to the desired piston position, and if the engine does not fire, the next iteration increments the delivery time. After multiple iterations the delivery time reaches the maximum $t_3$ and is then reduced until it again reaches $t_1$. The delivery time continues to be swept through the range until a strong firing occurs. At the time the strong firing occurs, the timing will be held constant until starting occurs.

The current engine speed may be compared to the engine speed sensed before the timing sweep was performed to determine when the engine 10 has started. Typically, engine starting includes three engine speed ranges. For example, from 0–200 revolutions per minute (RPM) the engine 10 is said to be cranking (cranking speed range). Once the engine 10 starts, then the engine speed accelerates from engine cranking speeds to engine running speeds (acceleration speed range). Once the engine speed reaches a predetermined engine RPM, e.g., 900 RPM, then the engine 10 is said to be running (running speed range). Therefore, in one embodiment, the engine may be determined to be started when the engine speed exceeds the cranking speed range, e.g., 200 RPM. When the engine has started, the delivery timing of the injection command signal is maintained at the value at which the engine 10 started, with allowances for instantaneous RPM changes.

In an alternative embodiment, a timing map may be developed indicating injection timing as a function of temperature and position of the piston 60. Therefore, a position of 2 degrees after top dead center may be desired. If the temperature is −25 degrees Celsius then the appropriate start of injection is selected. If that injection does not work, the timing is swept based on the desired injection timing for a range of crank angle positions, as illustrated in FIG. 6.

Industrial Applicability

The present invention provides an apparatus and method for controlling the fuel injection timing of a fuel injector in order to start an engine. In the preferred embodiment the fuel injector is a hydraulically-actuated unit injector (HEUI). However, a conventional fuel injector that is associated with a common rail fuel system is equally applicable. The temperature of the engine is sensed and an engine temperature signal indicative of the temperature of actuating fluid used to actuate the injector is generated. A desired piston firing position is determined, and an injection command signal is generated, whose timing oscillates between a time range that is a function of said temperature and said desired piston firing position, to control the fuel injection timing.

At engine starting conditions while the engine is cranking but not yet firing, the present invention employs a sweeping strategy to determine a delivery time for the injection command signal.

The operation of the sweeping strategy includes determining a timing range for the delivery of the injection command signal, determining a starting point of the timing sweep, from which, the sweep variable is swept continuously across a range of delivery values—until the engine starts, or a strong cylinder firing occurs. The elapsed time for the sweep variable to sweep from the minimum value to the maximum value and back to the minimum value may be approximately 10 seconds, for example. The predetermined initial value of the sweep variable may be modified in response to current operating conditions.

Other aspects, objects, and advantages of the present invention can be obtained from a study of the drawings, the disclosure, and the claims.

What is claimed is:

1. A method for controlling a fuel injection timing of a fuel injector to start an engine, comprising the steps of:
   sensing the temperature of the engine and producing an engine temperature signal indicative of the temperature of actuating fluid used to actuate the injector;
   determining a desired piston firing position; and
   producing an injection command signal whose timing oscillates between a time range that is a function of said temperature and said desired piston firing position, to control the fuel injection timing.

2. A method, as set forth in claim 1, further comprising the steps of:
   sensing a speed of said engine;
   determining said engine is running; and
   selecting a preferred timing of said injection command signal in response to said engine running, and said injection command signal.

3. A method, as set forth in claim 2, further comprising the steps of:
   ending said oscillation in response to said engine running; and
   producing said injection command signal in response to said preferred timing.

4. A method, as set forth in claim 1, further comprising the steps of:
   sensing a speed of said engine;
   determining at least one strong cylinder firing; and
   selecting a preferred timing of said injection command signal in response to said at least one strong firing, and said injection command signal.

5. A method, as set forth in claim 4, further comprising the steps of:
   ending said oscillation in response to said at least one strong firing; and
   producing said injection command signal in response to said preferred timing.

6. A method, as set forth in claim 1, further comprising the step of determining said time range in response to said temperature, said desired piston firing position and a viscosity range.

7. A method, as set forth in claim 1, further comprising the steps of:
   sensing a speed of said engine; and
   selecting a preferred timing of said injection command signal in response to said engine speed.

8. A method, as set forth in claim 7, further comprising the step of determining at least one strong cylinder firing in response to said engine speed; wherein said preferred timing is selected in response to said at least one strong cylinder firing.

9. A method, as set forth in claim 7, further comprising the step of determining said engine is running in response to said engine speed; wherein said preferred timing is selected in response to said engine running determination.

10. A method, as set forth in claim 9, further comprising the step of:
    determining at least one strong cylinder firing in response to said engine speed; and
    wherein the step of determining said engine is running includes the step of determining said engine is running in response to a plurality of said strong cylinder firing.

11. A method, as set forth in claim 1, further comprising the steps of:
    sensing a speed of said engine;
    determining a characteristic of said engine in response to said speed; and
    selecting a preferred timing of said injection command signal in response to said engine characteristic.

12. A method, as set forth in claim 11, wherein the step of determining said characteristic further comprises the step of determining at least one strong cylinder firing in response to said engine speed.

13. A method, as set forth in claim 11, wherein the step of determining said characteristic further comprises the step of determining said engine is running in response to said engine speed.

14. A method, as set forth in claim 13, further comprising the step of:
    determining at least one strong cylinder firing in response to said engine speed; and
    wherein the step of determining said engine is running includes the step of determining said engine is running in response to a plurality of said strong cylinder firing.

15. An apparatus for controlling a fuel injection timing of a fuel injector to start an engine, comprising:
    a temperature sensing device adapted to sense a temperature of the engine and responsively produce an engine temperature signal indicative of the temperature of actuating fluid used to actuate the injector; and
    a controller adapted to receive said temperature signal, determine a desired piston firing position, and responsively produce an injection command signal whose timing oscillates between a time range that is a function of said temperature and said desired piston firing position, to control the fuel injection timing.

16. An apparatus, as set forth in claim 15, wherein said controller is further adapted to determine said time range in response to said temperature, said desired piston firing position and a viscosity range.

17. An apparatus, as set forth in claim 15, further comprising:
    a speed sensing device adapted to sense the speed of the engine and responsively produce a speed signal; and
    wherein said controller is adapted to receive said speed signal and determine said engine is running in response to said speed signal, and select a preferred timing of said injection command signal in response to said engine running, and said injection command signal.

18. An apparatus, as set forth in claim 17, wherein said controller further comprises:

wherein said controller is adapted to end said oscillation in response to said engine running and produce said injection command signal in response to said preferred timing.

19. An apparatus, as set forth in claim 15, further comprising:

a speed sensing device adapted to sense the speed of the engine and responsively produce a speed signal; and wherein said controller is adapted to receive said speed signal and determine at least one strong cylinder firing occurred in response to said speed signal, and select a preferred timing of said injection command signal in response to said at least one strong cylinder firing, and said injection command signal.

20. An apparatus, as set forth in claim 19, wherein said controller further comprises:

wherein said controller is adapted to end said oscillation in response to said at least one strong cylinder and produce said injection command signal in response to said preferred timing.

21. A method for controlling a fuel injection timing of a fuel injector to start an engine, comprising the steps of:

sensing a temperature indicative of the temperature of an actuating fluid used to actuate the injector;

determining a desired piston firing position;

determining a time range in response to said temperature and said desired piston firing position; and producing an injection command signal whose timing varies within said time range.

22. A method, as set forth in claim 21, further including the steps of:

sensing a speed of said engine; and determining a desired timing of said injection command signal in response to said engine speed.

23. A method, as set forth in claim 22, further including the step of determining at least one strong firing in response to said engine speed; wherein said desired timing is determined in response to said strong cylinder firing.

24. A method, as set forth in claim 23, further including the step of ending said injection command signal timing variation in response to said strong cylinder firing.

25. A method, as set forth in claim 22, further including the step of determining said engine is running in response to said engine speed; wherein said desired timing is determined in response to said engine running.

26. A method, as set forth in claim 25, further including the step of ending said injection command signal timing variation in response to said engine running.

27. A method, as set forth in claim 22, wherein the step of determining said time range further includes the step of determining said time range in response to said temperature, said desired piston firing position, and a viscosity range.

28. An apparatus for controlling a fuel injection timing of a fuel injector to start an engine, comprising:

a temperature sensing device adapted to sense a temperature indicative of the temperature of actuating fluid used to actuate the injector; and a controller configured to receive said temperature signal, determine a desired piston firing position, determine an injection command time range in response to said temperature and said desired firing position, and responsively produce an injection command signal whose timing varies within said time range.

29. An apparatus, as set forth in claim 28, further including:

a speed sensing device adapted to sense the speed of the engine and responsively produce a speed signal; and wherein said controller is configured to receive said speed signal and determine said engine is running in response to said speed signal, and determine a desired timing of said injection command signal in response to said engine running, and said injection command signal.

30. An apparatus, as set forth in claim 29, wherein said controller further includes:

wherein said controller is configured to end said injection command signal timing variation in response to said engine running and produce said injection command signal in response to said desired timing.

31. An apparatus, as set forth in claim 28, further including:

a speed sensing device adapted to sense the speed of the engine and responsively produce a speed signal; and wherein said controller is configured to receive said speed signal and determine at least one strong cylinder firing occurred in response to said speed signal, and determine a desired timing of said injection command signal in response to said at least one strong cylinder firing, and said injection command signal.

32. An apparatus, as set forth in claim 31, wherein said controller is adapted to end said injection command signal timing variation in response to said at least one strong cylinder and produce said injection command signal in response to said preferred timing.

33. An apparatus, as set forth in claim 28, wherein said controller is further adapted to determine said time range in response to said temperature, said desired piston firing position and a viscosity range.

* * * * *